United States Patent

[11] 3,611,089

| [72] | Inventors | Boris Mokrytzki<br>Highland Heights;<br>Peter W. Hammond, Chagrin Falls, both of Ohio |
|---|---|---|
| [21] | Appl. No. | 863,903 |
| [22] | Filed | Oct. 6, 1969 |
| [45] | Patented | Oct. 5, 1971 |
| [73] | Assignee | Reliance Electric Company |

[54] PHASE SENSITIVE MOTOR CIRCUIT UTILIZING REAL CURRENT COMPONENT
15 Claims, 9 Drawing Figs.

[52] U.S. Cl. .................................................... 318/227, 318/230, 318/231
[51] Int. Cl. .......................................................... H02p 5/40
[50] Field of Search ............................................ 318/227, 230, 231

[56] References Cited
UNITED STATES PATENTS
3,402,336  9/1968  Risberg ........................ 318/227
3,331,003  7/1967  King ............................. 318/231
3,512,067  5/1970  Landau ......................... 318/230 X Primary Examiner—Gene Z. Rubinson
Attorney—Woodling, Krost, Granger and Rust ABSTRACT: An induction motor energization circuit is disclosed with energization from a variable frequency device such as an inverter. The load current to the induction motor has a considerable lagging power factor and a phase sensitive detector detects only the in-phase or directly out-of-phase component of this load current and applies it as a control to regulate the variable frequency device. At high frequency, the constant volts per cycle operation of the motor is satisfactory but at low speeds the usual energization system of adjusted constant volts per cycle results in overexcitation of the motor causing considerable losses and overheating. By the present invention the use of only the real component of the motor load current as a feedback signal results in considerably lower losses in the motor. The foregoing abstract is merely a resume of one general application, is not a complete discussion of all principles of operation or applications, and is not to be construed as a limitation on the scope of the claimed subject matter.

INVENTORS.
BORIS MOKRYTZKI
BY PETER W. HAMMOND
Woodling, Krost,
Granger and Rust
ATTORNEYS.

INVENTORS.
BORIS MOKRYTZKI
PETER W. HAMMOND
BY Woodling, Krost,
Granger and Rust
ATTORNEYS.

3,611,089

PHASE SENSITIVE MOTOR CIRCUIT UTILIZING REAL CURRENT COMPONENT

BACKGROUND OF THE INVENTION

The typical induction motor operation is thought of as a constant speed operation because of the usual application of a constant frequency, e.g., 60 Hz. to the motor resulting in a speed proportional to that frequency and inversely proportional to the number of the poles in the motor. For variable speed operation the prior art for many years has used DC motors because of their good variable speed characteristics and good starting torque. However, in many applications such as steel mills, process lines, etc., the atmosphere may be very dusty or corrosive and as a result the DC motor with its commutator and brushes is not only a maintenance problem but actually hazardous because of the arcing at the brushes. The dusty atmosphere causes frequent brush replacement and even frequent turning down of the commutator. In such atmosphere and use conditions, the squirrel cage induction motor with its absence of brushes, commutators, and slip rings and its rugged construction is highly desirable. Yet operation from a constant frequency source means that the motor has lower starting torque, high starting currents and essentially a constant speed operation.

In recent years operation of the induction motors from variable frequency devices such as cycloconverters and inverters has come into increasing use in order to obtain a variable speed of operation of the induction motor. The typical circle diagrams and equivalent circuit for induction motors found in textbooks and handbooks are approximations at best, and are approximations based on the premise of operation of the induction motor at a medium frequency, for example, 50 or 60 Hz. This is because the induction motor has been around for decades and for all of its early years was considered essentially a constant frequency, constant speed device. Now that the motor is being used in variable frequency and hence variable speed applications, it has been found that new problems have arisen in the low end of the speed range. On inverter drives a speed range of 10:1 is typical and with pulse width modulation techniques the speed range may be 50:1 or even 100:1. This means that a motor with a 1,750 r.p.m. base speed may be operated down to 175 r.p.m. or even down to as low as 17.5 r.p.m. with PWM techniques. At this low frequency low speed operation, it has been found that the motor overheats and can overheat much worse for light loads than it does for heavy loads. This seems to be the reverse of what one would expect, and it has been found that this overheating is caused by overexcitation. Because the induction motor typically draws a lagging current, the prior art technique of using load current as a feedback signal for control of the inverter has caused an overexcitation primarily in the low speeds range. This overexcitation has caused increased losses especially at light loads. Accordingly it has also been necessary to oversize the motor or sacrifice torque at low speeds due to the excitation heating at light loads or no loads.

Accordingly an object of the invention is to eliminate undesirable overheating of the motor at light loads.

Another object of the invention is to provide a phase sensitive circuit for a motor which is responsive to only the real component; that is, in-phase or 180° out-of-phase (regenerative) component of the motor load current.

Another object of the invention is to provide an IR drop compensation circuit which gives an optimized compensation for IR drop throughout the frequency and load range of operation of an inverter fed induction motor.

Another object of the invention is to provide a phase sensitive detector to detect between the in-phase component and the reactive component of motor load current.

Another object of the invention is to provide a phase sensitive motor current circuit which decreases the excitation at low loads to avoid overheating of an induction motor.

SUMMARY OF THE INVENTION

The invention may be incorporated in a motor circuit comprising in combination, an induction motor, a variable frequency device connected between voltage source terminals and said motor to supply energy of a variable frequency for varying the speed of said motor, regulator means connected to regulate the output of said variable frequency device, phase sensitive detector means connected to detect the in-phase component of the motor current, and control means connected to be responsive to the in-phase current component of said detector means and connected to control said regulator means.

Other objects and a fuller understanding of the invention may be had by referring to the following description and claims, taken in conjunction with the accompanying drawings.

DESCRIPTION OF THE PREFERRED EMBODIMENT

Figure 1:
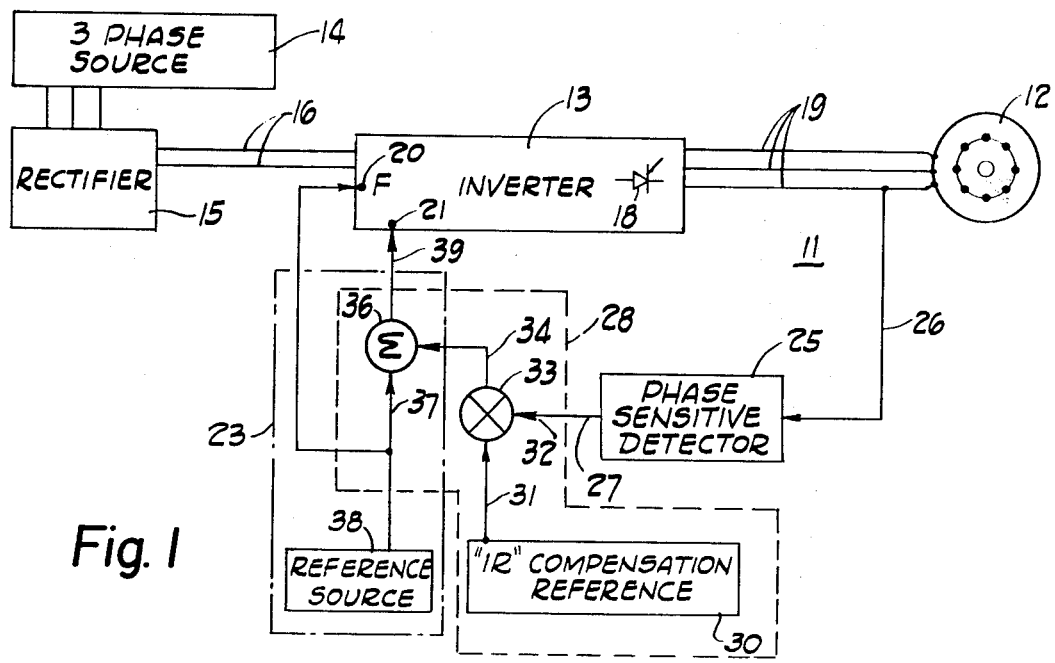
FIG. 1 is a schematic diagram of a motor circuit utilizing the invention.

FIG. 1 shows a schematic diagram of a motor circuit 11 incorporating a preferred embodiment of the invention, however it will be understood from the entire disclosure including the claims that the invention is not limited to this particular form shown in FIG. 1. This motor circuit 11 includes generally a motor 12 shown as an induction motor and this may be a squirrel cage motor for ruggedness. Also included is a variable frequency device 13 which may be a cycloconverter, for example, but preferably is an inverter. The inverter 13 is supplied with energy from a voltage source 14 shown as a three-phase source supplying energy via a rectifier 15 which in turn supplies direct current energy on conductors 16 to the inverter 13. The inverter 13 may include a plurality of controllable conducting devices such as triacs or thyristors 18 to selectively control the frequency and the voltage of the energy supplied on conductors 19 to the motor 12. In this embodiment these conductors 19 are shown as supplying three-phase energy to the motor 12. The inverter 13 has a frequency control terminal 20 and a voltage control terminal 21 supplied with appropriate signals from a regulator 23. The inverter 13 may be any one of several different conventional types for example it may be that shown in the Mokrytzki U.S. Pat. No. 3,391,328 issued July 2, 1968; that in the Mokrytzki application Ser. No. 624,539 filed March 20, 1967 for "Pulse Width Modulated Inverter;" or that in the Hammond U.S. application Ser. No. 755,927 filed Aug. 28, 1968, entitled "Synchronizing Circuit." In general the inverter 13 has a frequency control signal applied to the control terminal 20 in order to control the frequency of the output of the inverter on the conductors 19 and hence control the speed of operation of the motor 12. Also a voltage control signal applied to the control terminal 21 controls the magnitude of the output voltage and hence controls the torque or load carrying capabilities of the motor 12.

The motor circuit 11 also includes a phase sensitive detector means 25 having a feedback 26 from the conductors 19 or the motor 12 sensing the amount of motor current. The phase sensitive detector means 25 detects the real component of the motor current, that is, either the in-phase or the 180° out-ofphase component of the motor load current and distinguishes this from the reactive component of the load current. The detector means 25 has an output on conductor 27 to a control means 28. This control means 28 includes an IR drop compensation reference source 30 supplying a reference signal on one input 31 of a multiplier 33. The phase sensitive detector means 25 has the output 27 supplied to a second input 32 of this multiplier 33. The multiplier 33 may be an electronic or solid-state multiplier or may be simply a potentiometer to multiply together the two signals on the inputs 31 and 32. The multiplier 33 has an output 34 to a summing device 36 which sums the IR compensation signal and a volts per cycle reference signal on another input 37 from a volts per cycle reference source 38. The summing device 36 has an output on a conductor 39 to the voltage control terminal 21 to control the volts per cycle of the inverter and hence the power or torque output of the motor 12.

The phase sensitive detector means 25 is sensitive to whether the motor 12 is operating as an induction motor or whether there is regenerative current flowing and this motor is acting as an induction generator. Accordingly the phase sensitive detector means 25 senses the net in-phase current or the net 180° out-of-phase current, that is, it senses the real component of the current as distinguished from the reactive portion of this current.

Figure 2:
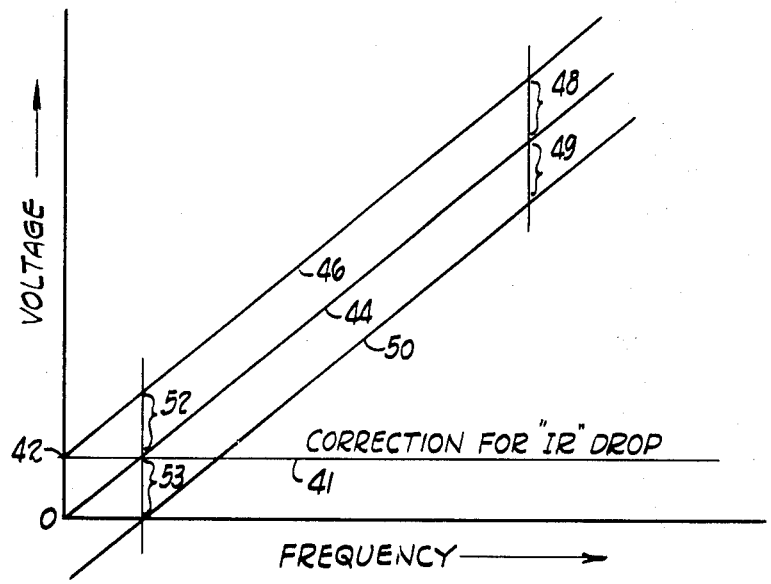
FIGS. 2 and 3 are graphs of operating characteristics of the circuit.

Frequently in a variable frequency variable voltage AC drive system such as the motor circuit 11, the applied voltage on conductors 19 is adjusted to provide a constant volts per cycle ratio, which in an ideal motor produces constant flux in the airgap. Because of the IR drops or conduction drops of the practical motor 12, the air gap flux in the motor decreases as the load current increases. On a per unit basis, these voltage drops are a few percent of the base voltage, and therefore the effects are negligible at high-frequency (high voltage) outputs yet are significant at low-frequency (low voltage) operation. Thus to operation over a wide frequency range of 100:1 or even 10:1 of the base speed, the volts per cycle ratio must be modified or adjusted, especially at low frequencies. For constant torque of the motor the load current is virtually constant. Considering first a constant maximum torque, the resistive portion of the conduction drop is constant for all frequencies. This is shown by a curve 41 on FIG. 2 which shows the amount of correction or compensation required for this IR drop at a constant maximum torque. This curve 41 has an intercept at point 42 on the Y axis. A constant volts per cycle curve 44 is also shown on FIG. 2 which plots voltage versus frequency and this has an intercept at the origin of the X and Y axis and is a constant linear slope. Accordingly a composite compensation or shaping for constant maximum torque is shown by a curve 46 on FIG. 2 which consists simply of a threshold or a Y intercept applied to the volts per cycle characteristic curve 44. This characteristic curve 46, it applied to the motor 12 with a constant load, for which the amount of IR drop compensation reference at the multiplier 33 has been adjusted, will produce substantially constant stator flux throughout the frequency range. However, this is for a constant torque, and in the above example is constant maximum torque of the motor. Now as the load on the motor is reduced, and for a constant frequency, one will find that the motor is operating on a family of curves parallel to and between curves 44 and 46 over a range 48 of motor load shown between curves 44 and 46 of FIG. 2. If the motor operates through a condition of zero load and begins to be driven as an induction generator, then the induction generator action is throughout a range 49 on the other side of the constant volts per cycle curve 44. This range of generator action 49 extends to a curve 50 which is the IR drop compensation curve for maximum generator action and will be parallel to the curve 44. The above is with varying loads at a fairly high frequency, for example, a 1,750 r.p.m. base speed motor operating at or near such base speed. FIG. 2 also shows a range 52 of operation for motor action at varying loads at a selected low frequency of operation and a corresponding range 53 of induction generator action for varying loads at this same selected low frequency of operation.

Figure 3:
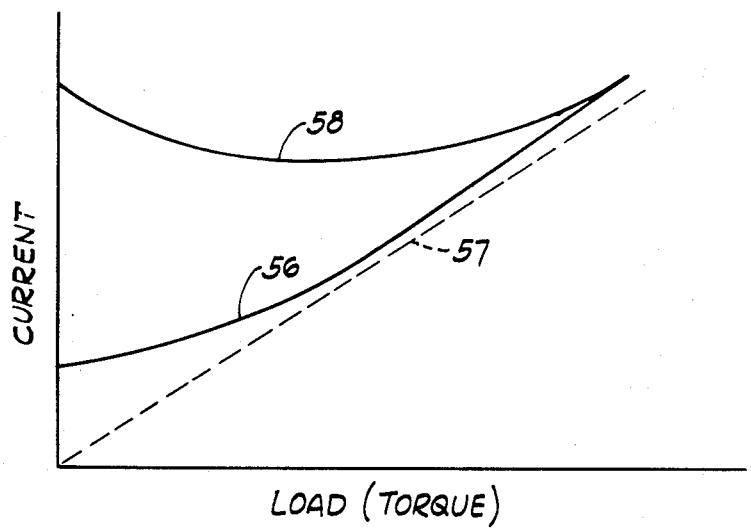

FIG. 3, however, shows the effects of operating with varying loads. FIG. 3 is a graph of current versus load and whereas it is usually considered that the load current is proportional to the load or torque, this FIG. 3 shows that such is not the case for a variable frequency supply device such as an inverter operation. A curve 56 shows the current versus load characteristic for a high-frequency range such as range 48 of FIG. 2. This curve 56 is essentially parallel to a linear slope curve 57 passing through the origin at the high current end of this curve but at the low current and low load end of this curve 56 it curves upwardly to intersect the Y axis, showing a substantial current flow at zero load. FIG. 3 further shows a curve 58 of current versus load for a typical low frequency operation such as over the range 52 in FIG. 2. This curve 58 shows that the load current can and actually does increase at the light load end of this curve with the current increasing at the point of intersection of the Y axis which is the zero load condition. The reason for this increased motor current as the load on the motor is reduced, is that the flux increases and produces excessive excitation losses which is aggravated by operation at low frequencies. If an attempt to adapt the compensation to the load is made using a load current signal, difficulties arise as shown by this FIG. 3. This curve 58 especially shows that the load current is not significantly affected by the motor load for a volts per cycle characteristic which has been compensated. The current is high at no load because of the heavy reactive current produced as a result of overexcitation. Accordingly the present invention has discovered a much more suitable compensating signal by utilizing the in-phase component of the motor current as shown by the linear slope curve 57. It has been found that the real component or the in-phase component of the motor current is directly proportional to the torque of the motor and accordingly this real component of the motor current is used as an IR drop compensation signal. The phase sensitive detector means 25 monitors the motor current and generates a signal proportional to the real component of the load current. This signal is applied to the multiplier 33 which modulates the level of the compensation to the volts per cycle circuit. For example, if this multiplier 33 is a potentiometer, then this potentiometer may be set higher for a small motor, for example, wherein the IR drop is greater, and set lower for a large motor wherein the IR drop is smaller.

The phase sensitive detector means 25 may take a number of forms including single and polyphase versions with more or less precision, depending upon the degree of speed or accuracy required. One version is the preferred embodiment shown in FIG. 4. This detector means circuit 25 shown in FIG. 4 includes phase detector circuits 61, 62 and 63 for each of the three phases of a polyphase source, shown as three-phase. These phase detector circuits may be identical and only circuit 61 will be described in detail. Terminals 64, 65 and 66 are phase input terminals carrying current proportional to and directly in phase with current on the conductors 19 to the motor 12. This may be obtained in a number of ways, for example, by use of a small current transformer on each of the conductors 19, or by Hall effect transducers. Each phase detector circuit 61, 62 and 63 has a first path 67 and a second path 68 leading to a common terminal 69. The first path 67 includes a resistor 71 and the second path 68 includes a second resistor 72 of one-half the ohmic value of resistor 71. Preceding this resistor 72 there is a unity gain inverting operational amplifier 73 which is inverting because of the input to the negative terminal and is unity gain because an input resistor 74 has the same resistance value as a feedback resistor 75. Parallel and oppositely connected diodes 77 protect an FET switch 78 connected in series in the path 68. The switch 78 has a gate 79 connected to be triggered into conduction by a ring counter 80 in synchronism with the phase voltage for that particular phase.

The phase sensitive detector means 25 also includes an inverting amplifier 81 which amplifies the DC component of the current appearing on terminal 69. A filter capacitor 82 smooths the output voltage of the amplifier 81 appearing on the compensation signal output terminal 27 and a feedback resistor 83 sets the gain of the amplifier 81 which may be a low gain, for example, unity gain.

Figure 4:
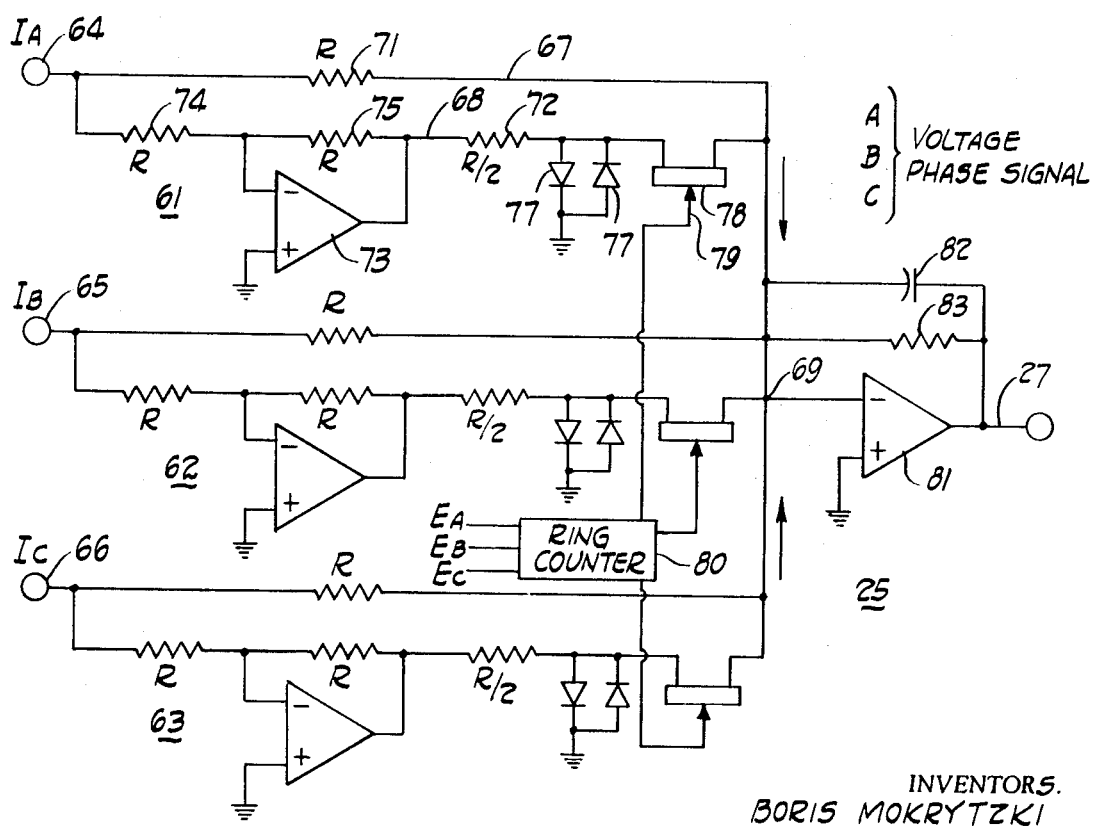
FIG. 4 is a schematic diagram of the preferred embodiment of phase sensitive detector means.

The operation of the phase sensitive detector means 25 of FIG. 4 may be explained by use of the current diagrams of FIG. 5. Considering just a single phase detector circuit 61 and assuming for the moment that a direct current is flowing through the two paths 67 and 68, one will observe that in the fist path 67 a current will flow equal to E/R. Because resistor 72 has only one-half the resistance value of resistor 71, then in this second path 68 a current will flow equal to −2E/R. Accordingly FIG. 5A shows a steady DC current 86 equal to E/R will flow in path 67 under this hypothetical situation of a direct current flow. In the second path 68 a current I=−2E/R as shown by curve 87 will flow and this is negative because of the inverting amplifier 73. It is assumed that the current flows only half the time; that is, the switch 78 is open half the time and closed half the time. FIG. 5C shows a resulting curve 88 of a combination of curves 86 and 87 occurring at the common terminal 69 which results from a summation of the currents through the two paths 67 and 68. This is a straight algebraic summation and it shows that the current alternates from a minus to a plus one unit value with the intervals of negative and positive being equal.

Figure 5A:
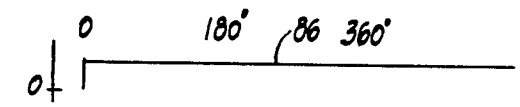
FIG. 5 is a graph of currents explaining operation of the circuit of FIG. 4.
Figure 5B:
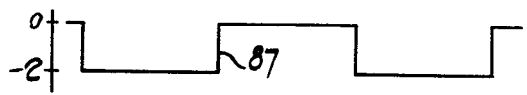
Figure 5C:
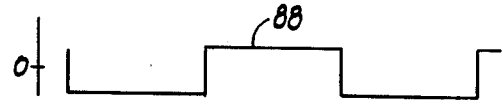
Figure 5D:
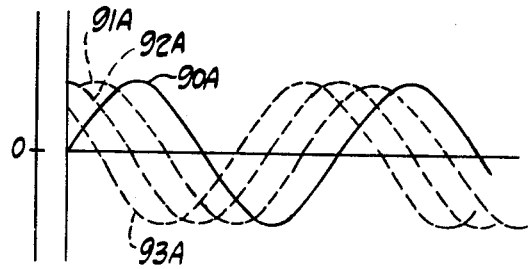
Figure 5E:
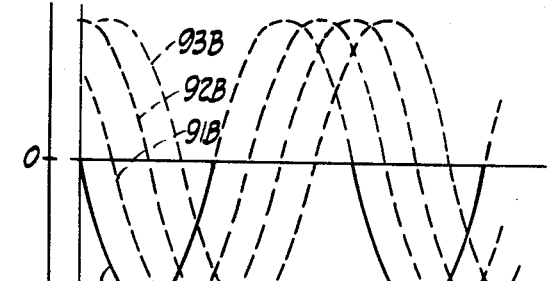
Figure 5F:
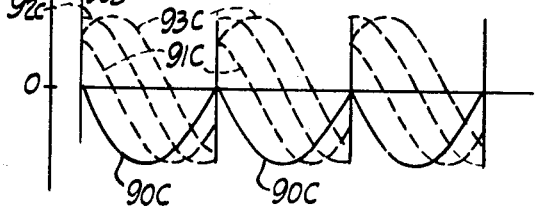

With this simplified explanation, next consider FIGS. 5D and 5E and 5F which show a sinusoidal current flow. FIG. 5D shows a curve 90A of current flow through the first path 67, assuming a zero phase angle between the phase current and the phase voltage such as $E_A$, which triggers the gate 79 of the FET switch 78. FIG. 5E shows a curve 90B of the inverted and doubled current in the second path 68 for the same zero phase angle. FIG. 5F shows a composite curve 90C which is a summation of the two currents at the terminal 69 of the two curves 90A and 90B. It will be noted that in each half cycle the current curve 90C is a maximum negative and accordingly when inverted by the inverting amplifier 81 will appear as a maximum positive compensation signal at terminal 27.

Next consider a current curve 91A in path 67 which is a 45° lagging current such as is commonly incurred in induction motor operation as an induction motor. Curve 91B in FIG. 5E shows the current through path 68 and curve 91C in FIG. 5F shows the composite current 91C of the current at terminal 69. It will be noted that the average negative current is less than that of the negative current for curve 90C. Next for a 90° lagging current such as occurs during idling of an induction motor with just the magnetization current and no windage and friction losses, then a curve 92A in FIG. 5D shows the current through path 67. FIG. 5E shows a curve 92B of current through path 68 and FIG. 5F shows a curve 92C of the composite current at terminal 69. This is a curve which is equal on both the positive and negative sides of the zero axis and hence when filtered by the capacitor 82, there will be a zero voltage appearing as a compensation signal at the terminal 27. Next consider when the induction motor is regenerating and acting as an induction generator when the current will lag 135° for example, and a curve 93A will be typical for the current through path 67. Current curve 93B will show the current flow through path 68 and current curve 93C will show the composite current at terminal 69. This is a positive average voltage and when inverted by inverting amplifier 81 it will appear as a definite negative compensation signal at the terminal 27. This shows that the compensation signal changes sign at the proper time; namely, the changeover from motoring action to regenerative action. Accordingly the compensation is subtracted during regeneration and is added during motoring.

Figure 6:
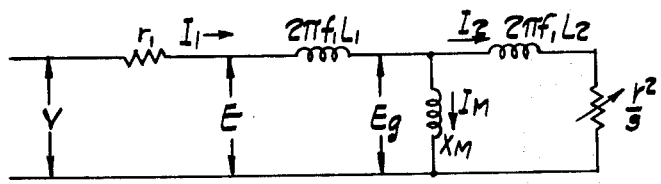
FIG. 6 is a diagram of an equivalent circuit for an induction motor.

The analysis of induction motors under conditions of variable frequency operation can be based on the classical equivalent circuit shown in FIG. 6. FIG. 6 shows the medium frequency induction motor equivalent circuit per phase where;

$r_1$ = stator resistance
$r_2$ = rotor resistance
$L_1$ = stator inductance
$L_2$ = rotor inductance
$X_M$ = mutual inductive reactance E = stator total induced voltage
$E_g$ = stator and rotor air gap induced voltage
S = slip = Syn. r.p.m.−r.p.m./Syn. r.p.m.

For a given motor design $E_g = K_g \Phi_g f_1$ where $\Phi_g$ is the airgap flux and $K_g$ is a constant.

The developed torque per phase can be expressed in terms of the equivalent circuit parameters as;

$T = 7.04/\text{syn r.p.m.} \times I_2^2 r_2/s$ in lbs.-ft.

where $$I_2 = \frac{E_g}{\sqrt{\left(\frac{r_2}{s}\right)^2 + (X_2)^2}}$$

In constant torque operation below base speed, the ability to independently control voltage and frequency permits operation with relatively low values of slip. Assuming low slip and considering that the frequency will be relatively low in the region below base speed, the rotor leakage reactance $X_2$ can be assumed to be much less than $r_2/s$ and as an approximation $X_2$ can be neglected. Therefore;

$I_2 = E_g/r_{2/s} = s\, E_g/r_2$ since $r_2/s >> X_2$

And $T = 7.04\, I_2^2/\text{syn r.p.m.} \times E_g/I_2$ since $r_2/s = E_g/I_2$ $T = 7.04\, I_2\, [E_g/\text{syn r.p.m.}$ Substitute syn r.p.m. = $120 f_1$/poles $T = 7.04\, I_2 E_g/120 f_1/\text{poles} = 0.0586\, I_2 E_g/f_1 \times \text{poles}$ From the above equation it is seen that rated torque can be obtained with rated rotor current from base speed down to zero speed if the V and $f_1$ are adjusted to keep the ratio $E_g/f_1$ constant. Since $E_g = K_g \Phi_g f_1$, the ratio $E_g/f_1 = K_g \Phi_g$ and the developed torque is;

$T = K_t I_2 \Phi_g$

Figure 7:
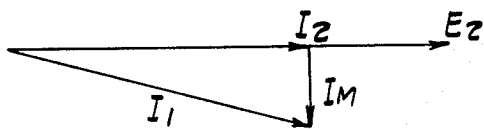
FIG. 7 is a vector diagram for FIG. 6.

Therefore, keeping the airgap flux constant is a requirement for constant torque, constant current operation. To minimize the rotor current for a given torque, the airgap flux $\Phi_g$ should be as high as possible within the magnetic saturation limits of the machine. From FIG. 6, if the rotor leakage reactance is neglected, the following current relationship holds;

$I_1^2 = I_M^2 + I_2^2$, as diagrammed in FIG. 7, so $I_2$ = Real Part of $I_1$ and $T = K_t \times \Phi_g \times$ Real Part of $I_1$ Minimizing the rotor current $I_2$ means that the real part of the stator current $I_1$ and therefore, the real power demand on the inverter is minimized. However, the airgap flux cannot be increased without limit, because an upper limit to $E_g$ is established by the inverter voltage limit and the increase in $\Phi_g$ causes an increase in $I_M$ which causes the quadrature component of stator current to increase.

Figure 8:
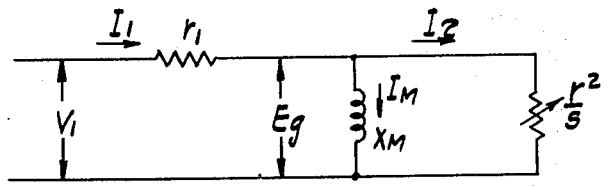
FIG. 8 is a schematic diagram of a simplified equivalent circuit.

At very low values of $f_1$, the stator leakage reactance $X_1$ is low compared to $r_1$, so $X_1$ can be neglected. The equivalent circuit at low frequencies and low values of slip is shown in FIG. 8.

Figure 9:
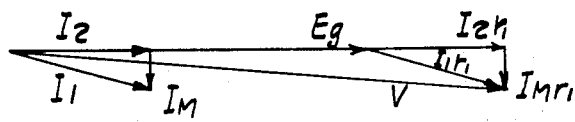
FIG. 9 is a vector diagram for FIG. 8.

From the vector diagram of FIG. 9

$\overline{V_1} = \overline{E_g} + \overline{I_2}r_1 + j\overline{I_M}r_1$

As seen in the vector diagram of FIG. 9, the effect of $jI_M r_1$ is quite small so as an approximation it can be neglected; Therefore;

$\overline{V_1} = \overline{E_g} + \overline{I_2}r_1$ and
$E_g = V_1 - I_2 r_1 = V -$ (Real part of $I_1$) $r_1$ It is seen that to maintain $E_g$ constant at any frequency as the load is increased on the motor, it is necessary to increase $V_1$ by an amount equal to $I_2 r_1$.

The above shows that the present invention utilizing an IR drop compensation feedback circuit to sense the Real Part of $I_1$, namely $I_2$, is used to increase the impressed voltage $V_1$ by $I_2 \times r_1$ as the load increases, thus the ratio $E_g/f_1$ can be held constant and the rotor current and consequently the real part of $I_1$ would be proportional to the load torque.

If slip r.p.m. × s × syn r.p.m. is substituted, $T = 7.04\, I_2^2 r_2/\text{slip r.p.m.}$ It is seen that to hold rated torque over the frequency range, both rotor current $I_2$ and slip r.p.m. are held at rated values.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A motor circuit comprising, in combination, an induction motor,
   a variable frequency device connected between voltage source terminals and said motor to supply energy of a variable frequency for varying the speed of said motor,
   regulator means connected to regulate the output of said variable frequency device,
   phase sensitive detector means connected to detect only the real component of the motor current,
   and control means connected to be responsive to the real current component of said detector means and connected to control said regulator means.

2. A motor circuit as set forth in claim 1, wherein said variable frequency device is an inverter.

3. A motor circuit as set forth in claim 1, wherein said control means is connected to be responsive to only the in-phase or the 180° out-of-phase component of current of said detector means.

4. A motor circuit as set forth in claim 1, wherein said phase sensitive detector means includes means to discriminate between the real component and the quadrature phase component of said motor current.

5. A motor circuit as set forth in claim 1, including a reference signal,
   and means in said control means to combine said reference signal with said current component to control said regulator means.

6. A motor circuit as set forth in claim 1, wherein said phase sensitive detector means includes means connected to sense the current to said motor and also includes means to discriminate between the in-phase component and the 180° out-of-phase component of said motor current.

7. A motor circuit as set forth in claim 6, including a reference signal,
   and means in said control means to combine said reference signal with either said in-phase or 180° out-of-phase current component to control said regulator means.

8. A motor circuit as set forth in claim 1, wherein said variable frequency device is connected to supply energy of a variable voltage to said motor for varying the torque of said motor.

9. A motor circuit as set forth in claim 8, wherein said regulator means is connected to regulate the variable voltage output of said variable frequency device for varying the torque of said motor.

10. A motor circuit as set forth in claim 8, including means connecting said control means to have an output responsive to said in-phase component of current and regulating the variable voltage output of said variable frequency device.

11. A motor circuit as set forth in claim 1, including an IR drop compensation reference source,
    a multiplier,
    means to supply said reference source and said real current component to two inputs of said multiplier,
    and means connecting the output of said multiplier to control said regulator means as an IR drop compensation signal.

12. A motor circuit as set forth in claim 11, including means to sense the difference between motoring current and regenerative current in said motor,
    and means to add or subtract, respectively, said IR drop compensation signal to said regulator according to whether motoring or regenerative current is flowing in said motor.

13. A motor circuit as set forth in claim 1, wherein said phase sensitive detector means includes first and second circuit paths connected in parallel,
    resistors in said first and second paths to establish the current flow in said first path at one-half the current flow in said second path,
    a unity gain inverting amplifier in said second path to establish a negative current therein,
    switch means connected in said second path,
    means connected to cause conduction through said switch means of current proportional to motor current in synchronism with the voltage polarity reversals of said variable frequency device,
    whereby at the output of said two paralleled paths a current is produced which is proportional to only the in-phase or 180° out-of-phase current.

14. A motor circuit as set forth in claim 1, wherein said motor is a three-phase motor and said variable frequency device is a three-phase supply,
    said phase sensitive detector means including a detector circuit for each phase,
    each detector circuit including first and second circuit paths connected in parallel,
    an input to each detector circuit from the respective phase current terminal of said variable frequency device,
    resistors in said first and second paths to establish the current flow in said first path at one-half the current flow in said second path,
    a unity gain inverting operational amplifier in said second path to establish a negative current therein,
    a semiconductor switch connected in said second path,
    ring counter means connected to trigger said semiconductor switch into conduction in synchronism with the polarity of the voltage of the respective phase becoming positive,
    an inverting summing amplifier having an input and an output,
    and means to connect the outputs of all three detector circuits to the input of said summing amplifier and the output thereof being an IR drop compensation signal proportional to only the in-phase or 180° out-of-phase current.

15. A motor circuit as set forth in claim 1, wherein said variable frequency device is an inverter connected to supply energy of a variable frequency for variable speed and a variable voltage for variable torque of said motor,
    voltage control means in said regulator means connected to control the variable frequency of said inverter output,
    means connected to sense the current in said motor connected to said phase sensitive detector means to have same discriminate between in-phase and quadrature phase current;
    and said control means including an IR drop compensation reference source,
    a multiplier,
    means connecting said IR drop compensation reference source to said multiplier,
    means connecting the in-phase current output of said phase sensitive detector to said multiplier,
    and said multiplier multiplying the two inputs and having an output as an error signal connected to said voltage control means for IR drop compensation in accordance with the in-phase component of current in said motor.